(12) United States Patent
Ketharam et al.

(10) Patent No.: US 8,425,809 B2
(45) Date of Patent: Apr. 23, 2013

(54) DEFORMABLE GRANULE PRODUCTION

(75) Inventors: Annapoorani Ketharam, Leicestershire (GB); Balasubramaniam Vaidhyanathan, Leicestershire (GB); Bala Praveen Chakkravarthy Raghupathy, Leicestershire (GB); Jonathan Graham Peel Binner, Leicestershire (GB)

(73) Assignee: Loughborough University, Leicestershire (GB)

( * ) Notice: Subject to any disclaimer, the term of this patent is extended or adjusted under 35 U.S.C. 154(b) by 129 days.

(21) Appl. No.: 12/998,385

(22) PCT Filed: Oct. 14, 2009

(86) PCT No.: PCT/GB2009/002463
§ 371 (c)(1),
(2), (4) Date: Jun. 13, 2011

(87) PCT Pub. No.: WO2010/043864
PCT Pub. Date: Apr. 22, 2010

(65) Prior Publication Data
US 2011/0241236 A1    Oct. 6, 2011

(30) Foreign Application Priority Data
Oct. 15, 2008 (GB) .................................. 0818851.8

(51) Int. Cl.
*B29B 9/00* (2006.01)
(52) U.S. Cl.
USPC .......... 264/6; 264/5; 264/13; 264/28; 264/49; 264/681; 264/115
(58) Field of Classification Search .................... None
See application file for complete search history.

(56) References Cited

U.S. PATENT DOCUMENTS

| | | | |
|---|---|---|---|
| 4,853,353 A | 8/1989 | Whalen et al. | 501/103 |
| 5,827,572 A | 10/1998 | Song et al. | 427/255.4 |
| 5,932,507 A | 8/1999 | van Weeren et al. | 501/105 |
| 6,069,103 A | 5/2000 | Kwon | 501/103 |
| 7,037,603 B2 | 5/2006 | Lasater | 428/701 |
| 7,169,336 B2* | 1/2007 | Lee et al. | 264/13 |
| 7,297,420 B2 | 11/2007 | Jiang | 428/701 |
| 7,399,722 B2 | 7/2008 | Shikata et al. | 501/105 |
| 2002/0190236 A1 | 12/2002 | Harada | 252/62.54 |
| 2004/0181270 A1 | 9/2004 | Jiang et al. | 607/116 |
| 2004/0192535 A1 | 9/2004 | Tanaka et al. | 501/103 |
| 2004/0208811 A1 | 10/2004 | Anflo et al. | 423/263 |
| 2004/0229031 A1 | 11/2004 | Gell et al. | 428/323 |
| 2005/0214616 A1 | 9/2005 | Kumar et al. | 429/33 |

FOREIGN PATENT DOCUMENTS

| | | |
|---|---|---|
| DE | 19614136 A1 | 10/1997 |
| EP | 0294988 A2 | 12/1988 |
| JP | 02-157157 | 6/1990 |
| JP | 2006-248858 | 9/2006 |
| JP | 2006264990 A | 10/2006 |
| WO | WO 98/00577 A1 | 1/1998 |
| WO | WO 02/094429 A1 | 11/2002 |
| WO | WO 03/103816 A2 | 12/2003 |
| WO | WO 2006/136780 A2 | 12/2006 |
| WO | WO 2008/083282 A2 | 7/2008 |

OTHER PUBLICATIONS

Hwang, C., et al., "Formation of nanostructured YSZ/Ni anode with pore channels by plasma spraying", © 2006 Elsevier B.V., 6 pgs.
Montanaro, L., et al., "Ceramic Foams by Power Processing", © 1998 Elsevier Science Limited, pp. 1339-1350.
Tian, W., et al., "Toughening and strengthening mechanism of plasma sprayed nanostructured A12O3-13 wt.%TiO2 coatings", © 2009 Elsevier B.V., pp. 642-649.
EP Search Report issued for corresponding GB Patent Application No. GB0818851.8, search performed Feb. 25, 2009.
Binner et al., *Processing of bulk nanostructured* ceramics J. Eur. Ceram. Soc., 28, 1329-1339, 2008.
Binner et al., *Microwave Sintering of Ceramics: What does it offer?* Key Eng. Mater., 264-268, 2339, 2004.
Chevalier et al., Bioceramics, vol. 10, edited by Sedal and Rey (9 pages), Oct. 1997.
Binner et al., *Microwave Hybrid Sintering of nanostructured YSZ* Ceramics, Advances in Science and Technology, vol. 45, 2006, 835-844.
Cottom et al., *Fracture Toughness of Nanocrystalline ZrO2-3 mol% Y2O3 Determined by Vickers* Indentation, Scripta Materialia, vol. 34, No. 5, 809-814, 1996.
Anstis et al., *A Critical Evaluation of Indentation Techniques for Measuring Fractures Toughness : I, Direct Crack measurements.* J. Am. Ceram. Soc., 533-538, 1981.
Muñoz-Saldaria et al., *Mechanical Properties and Low-Temperature Aging of Tetragonal Zirconia Polycrystals Processed by Hot Isostatic Pressing.* J. Mater. Res., vol. 18, No. 10, 2003.
Paul et al, *Hydrothermal Aging Behavior of Nanocrystalline Y-TZP Ceramics.* J. Am. Ceram. Soc. 94 [7] 2146-2152 (2011).

(Continued)

Primary Examiner — Mary F Theisen
(74) Attorney, Agent, or Firm — Winstead PC

(57) ABSTRACT

A method of forming granules, the method including forming a suspension of a nanopowder such as a nano zirconia powder containing yttria. The powder is formed from a suspension, and freon is added directly to the suspension as an additive. The suspension is then granulated by spray freeze drying, and the freon subsequently removed by heat treatment. The voids left by the vacated freon provide meso, micro and macro flaws or structural defects in the granules.

26 Claims, 3 Drawing Sheets

OTHER PUBLICATIONS

M. J. Mayo, *Processing of nanocrystaline ceramics from Ultrafine particles*, Int. Mater. Rev., 41, 85-115,1996.

F. Wakai, et al., *Superplasticity of Yttria-Stabalized Tetragonal ZrO2 Polycrystals*, Adv. Ceram. Mater., 1,259-263 1986.

J. Karch, et al, *Nanocrystalline Ceramics: Possible Candidates for Net-Shape Forming*, Ceram. Int.,16, 291-294, 1990.

P. Mondal, et al., *Enhanced specific grain boundary conductivity in nanocrystalline Y2O3-Stabilized Zirconia* Solid State Ionics, 118,331-339,1999.

C. Demetry and X. Shi, *Grain size-dependent electrical properties of rutile ($TiO_2$)*, Solid State Ionics, 118,271-279, 1999.

I. Kosacki et al., *Electrical conductivity of nanocrystalline ceria and zirconia thin films*, Solid State Ionics, 136-137, 1225-1233, 2000.

J. Karch, et al., *Ceramics ductile at low temperature*, Nature, 330, 556-558, 1987.

T. H. Cross and M. J. Mayo, *Ceramic-Ceramic Diffussion Binding Using Nanocrystalline Interlayers*, Nanostructured Mater., 3, 163-168, 1993.

M. J. Mayo, et al., *Mechanical properties of nanophase TiO2 as determined by nanoindentation*, J. Mater. Res., 5, 1073-1082, 1990.

J. R. Groza and R. J. Dowding, *Nanoparticulate Materials Densification*, Nanostruct. Mater., 7, 749-768,1996.

M. A. Meyers, et al., *Mechanical properties of Nanocrystalline materials*, Progress in Mater. Sci., 51, 427-556, 2006.

S. Sukla and R. Seal, *Mechanisms of room temperature metastable tetragonal phase stabilization in zirconia*, Int. Mater. Rev., 50 [1], 45-64, 2005.

I. Santacruz, et al., *Preparation of High Solids Content Nanozirconia Suspensions*, J. Am. Ceram. Soc. 91, [2], 398-405, 2008.

J. G. P. Binner, et al., *A Comparative Study of Temperature Measurement during Microwave Processing*, In Proc. of the 9th Int. Conf on Microwave and High Frequency Heating, pp. 477-480, 2003.

H. Toraya, et al., *Calibration Curve for Quantitative Analysis of the Monoclinic-Tetragonal ZrO2 System by X-Ray Diffraction*, J. Am. Ceram. Soc., 67,C 119-121, 1984.

J. Eichler, et al., *R-curve behavior of 2Y-TZP with submicron grain size*, J Eur. Ceram. Soc., 26, 3575-3582, 2006.

J. Lankford, *Indentation microfracture in the Palmqvist crack regime: implications for fracture toughness evaluation by the indentation method*, J. Mater. Sci. Lett., 1,493-495, 1982.

K. Niihara, et al., *Evaluation of Klc of brittle solids by the indentation method with low crack-to-indent ratios*, J Matter. Sci. Left., 13-16,1982.

K. Niihara, *A fracture mechanics analysis of indentation-induced Palmqvist crack in ceramics*, J Mater. Sci. Lett., 221-223, 1983.

J. Chevalier, *What future for zirconia as a biomaterial?* Biomaterials, 27, 535-543, 2006.

J. G. P. Binner, et al., UK Patent Appl. No. 0818851.8. Filed Oct. 2008.

O. Vasylkiv, et al., *Low-Temperature Processing and Mechanical Properties of Zirconia and Zirconia—Alumina Nanoceramics*, J. Am. Ceram. Soc., 86, [2], 299-304, 2003.

J. Luo, D. P. Almond and R. Stevens, *Ionic Mobilities and Association Energies from an Analysis of Electrical Impedence of ZrO2-Y2O3Alloys*, J. Am. Ceram. Soc., 83, [7], 1703-1708, 2000.

A. Bravo-Leon, et al., *Fracture toughness of nanocrystalline tetragonal zirconia with low yttria content*, Acta Materialia, 4555-4562, 2002.

J. Wang, M. Rainforth and R. Stevens, *Transaction—The Grain Size Dependence of the Mechanical Properties in TZP Ceramics*, Br. Ceram. Trans. J, 1-6, 1988.

M. S. Kaliszewski, G. Behrens, A. H. Heuer et al., *Indentation Studies on Y2O3-Stabalized ZrO2: I, Development of Indentation-Induced Cracks*, J. Am. Ceram. Soc., 77, [5] 1185-1193, 1994.

Y. He, L. Winnubst, et al., *Influence of Porosity on Friction and Wear of Tetragonal Zirconia Polycrystal*, J. Am. Ceram. Soc., 80, [2], 377-380, 1997.

C. T. Yang and W. J. Wei, *Effects of Material Properties and testing parameters on wear properties of fine-grain zirconia (TZP)* Wear, 97-104,2000.

S. W. Lee, S. M. Hsu and M. C. Shen, *Ceramic Wear Maps: Zirconia*, J. Am. Ceram. Soc., 76, [8],1937-1947, 1993.

K. H. Z. Gahr, W. Bundschuh and B. Zimmerlin, *Effect of Grain Size on Friction and Sliding Wear of Oxide Ceramics*, Wear, 162-164, 269-279, 1993.

I. Yamashita and K. Tsukuma, *Phase Seperation and Hydrothermal Degradation of 3 mol% Y2)3-ZrO2 Ceramics*, J Ceram. Soc. Jpn., 113, [8], 530-533, 2005.

I. Thompson and R. D. Rawlings, *Mechanical behavior of Zirconia and zirconia-toughened alumina in a simulated body environment*, Biomaterials, 11, 505-508, 1990.

K. Matsui, et al., *Cubic-Formation and Grain Growth Mechanisms in Tetragonal Zirconia Polycrystal*, J. Am. Ceram. Soc., 86, [8], 1401-1408,2003.

K. Matsui,et al., *Effect of alumina-doping on grain boundary segregation-induced phase transformation in yttria-stabalized tetragonal zirconia polycrystal*, J. Mater. Res., 21, [9], 2278-2289, 2006.

A. Suresh, et al., *Crystallite and Grain-Size-Dependent Phase Transformations in Yttria-Doped Zirconia*, J. Am. Ceram. Soc., 86, [2], 360-362, 2003.

B. Vaidhyanathan, et al., *Novel Processing of Nanostructured Ceramics Using Microwaves*, Institute of Polymer Technology and Materials Engineering; Loungborough University, Loungborough, Leicestershire, LE11 3TU, UK (7 pages).

H. Hahn, et al, *Low-Temperature Creep of Nanocrystalline Titanium(IV) Oxide*, J. Am. Ceram. Soc., 74, 2918-2921,1991.

W. E. Kuhn, Consolidation of Ultrafine Particles, in Ultrafine particles (ed. W. E. Kuhn), Wiley New York, 41-103, 1963.

R. Wurschum, et al.,*Disffusion in Nanocrystalline Metals and Alloys—A Status Report***, Adv. Eng. Mater., 5, 365-372,2003.

Denghao, et al., *Study on the Stability of Superfine $\alpha$-$Al_2O_3$ Suspensions with Polyelectrolyte*, Bulletin of the Chinese Ceramic Society, 2005, 1: 36-39. (8 pages).

Davies, J., et al., *The tole of ammonium polyacrylate in dispersing concentrated alumina suspensions*, © 2000 Elsevier Science Ltd., pp. 1539-1553.

* cited by examiner

DEFORMABLE GRANULE PRODUCTION

This invention concerns a method of forming granules from a nanopowder, and particularly but not exclusively a ceramic nanopowder, and also a method of manufacturing a component.

Several nanomaterials have been shown to yield desirable properties suitable for various applications. For example, nano grain sized alumina has been made in its unusual transparent form. Nano zirconia has been shown to have higher hydrothermal stability and fracture toughness than conventional zirconia ceramics. However, mass manufacturing of nanoceramic components is still a big challenge.

Die pressing is the preferred component manufacturing route. Unagglomerated ceramic nanopowders are though cohesive and have poor flowability and thus poor die filling characteristics. One way to overcome this problem is to granulate them. However, nanopowders have a tendency to form hard agglomerates during granulation, resulting in nanocomponents which may have undesirable material properties.

As the granule density increases, the primary particles (nanopowders) are closely packed within the granules. As the inter-particle distance reduces, the agglomerates thus formed are hard, i.e. they resist deformation when pressure is applied, and which leads to excessive grain growth during the sintering stage and hence the favourable nanostructure is lost. Low density granules are generally soft and hence crush down into fine particles yielding a homogeneous nanostructure when consolidated. However the latter suffer from poor flow and fill characteristics.

According to a first aspect of the present invention there is provided a method of forming granules, the method comprising forming a suspension of a nanopowder, adding to the suspension an additive, drying the suspension so as to form granules, and removing at least a substantial part of the additive from the granules to form flaws in the granules.

A concentrated suspension of nanoparticles may be produced, and the concentrated suspension may be produced by a method according to the applicant's patent application PCT/GB06/002081.

The additive may be a foaming agent or a pore former. The additive may have a boiling point or sublimation temperature of below 100° C. The additive may be a fluid or solid.

The additive may be any of freon, octylphenoxypolyethoyethanol such as Triton X available from National Diagnostics Inc of Atlanta USA, ammonium C6-10 alcohol ethoxysulfate such as Alpha foamer available from Stepan Canada Inc of Ontario Canada, or camphene.

The additive may be added to the suspension directly, or may be added in solution.

The suspension may be dried so as to form generally spherical granules, and may be dried using a spraying device. The suspension may be dried using spray freeze drying or spray drying.

As an alternative, the granules may be formed by fluidising or using a shear granulator.

Removing of the additive may include heating of the granules and/or subjecting the granules to reduced pressure. The heating may include microwave heating.

At least some of the additive may be removed in a controlled manner such that flaws are provided in the granules by removal of the additive.

At least some of the additive may be removed rapidly so as to produce cracks or other formations in the granules to provide flaws.

Additional additives may be added to the suspension, which additives may act as binders, plasticisers, or lubricants.

The nanopowder may be a ceramic powder, may be a zirconia powder, and may be yttria stabilised zirconia including up to 10 mol % yttria. The nanopowder may have a particle size of substantially 20 nm.

The suspension may be aqueous or non-aqueous.

According to a second aspect of the invention there is provided a method of manufacturing a component, the method including forming granules by a method according to any of the preceding thirteen paragraphs, locating the granules in a die press, and pressing the granules such that the granules break down to powder during pressing to form a green compact.

The green compact may be subsequently fired.

An embodiment of the present invention will now be described by way of example only and with reference to the accompanying drawings, in which:—

An yttria stabilised nano zirconia powder containing 3 mol % yttria with a particle size of substantially 20 nm, was formed into a 60 wt % solids concentrated suspension by a method according to the applicant's patent application no. PCT/GB06/002081. Freon was added directly to the suspension as an additive and thoroughly mixed in.

The suspension was granulated by spray freeze drying which involves spraying the suspension into a cryogent, and then driving off the liquid at low temperature under vacuum. The freon was then removed by a 70° C. heat treatment for one hour. The voids left by the vacated freon provide meso, micro and macro flaws or structural defects in the granules.

The granules were then located into a die press and pressed to form a green compact. Pressing of the granules causes the granules to be crushed and break into their primary particles. The green compact can subsequently be fired.

Figure 4:
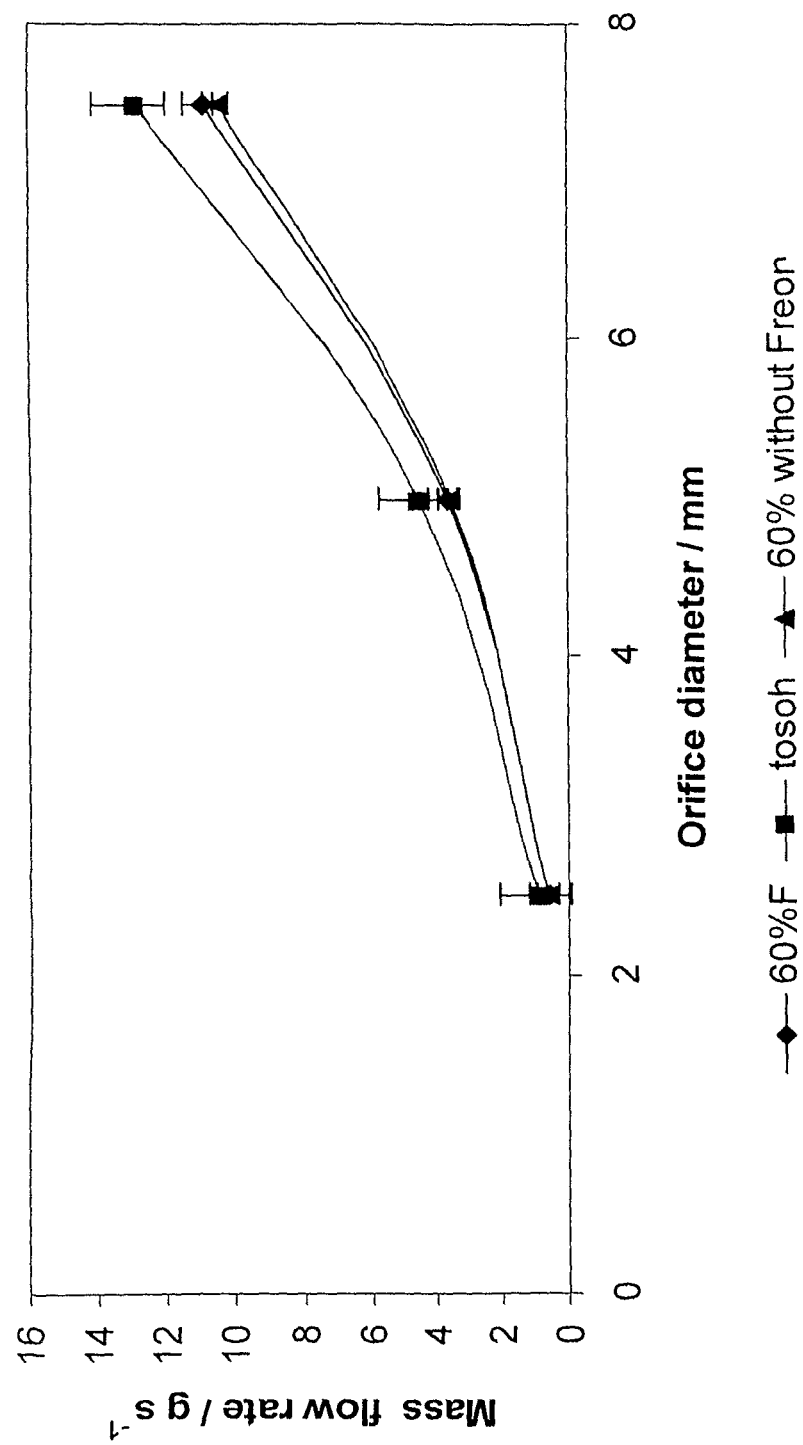
FIG. 4 is a graph of mass flow rate against orifice diameter for granules made according to the invention and otherwise, being tested in a Hall flowmeter.

The granules thus produced have excellent flowability as measured using a Hall flowmeter as illustrated in the graph of FIG. 4 which compares the above granulated nanopowder shown by the diamond plots, similar granules but without the Freon additive as shown by triangular plots, and shown by square plots Tosoh, a commercially available submicron zirconia powder supplied by Tosoh Corporation of Japan, and used as a benchmark standard in this case.

Figure 1:
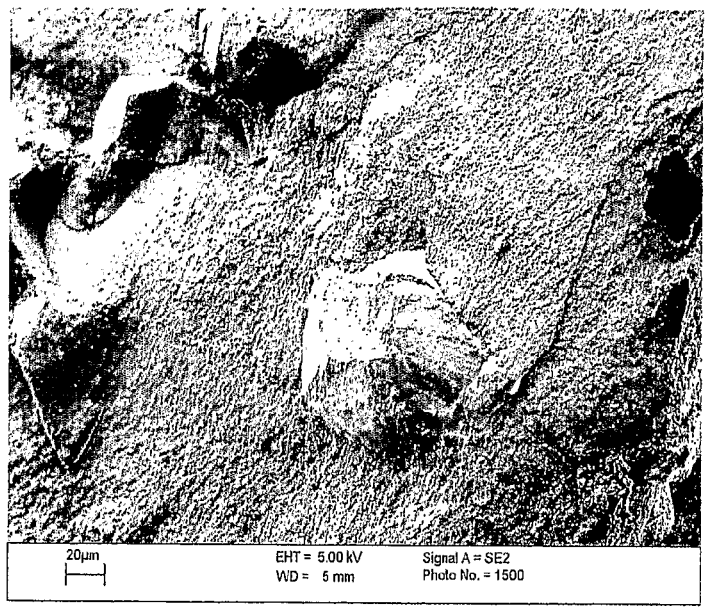
FIG. 1 is a microscopic image of a fracture surface of a die pressed compact not according to the invention.
Figure 2:
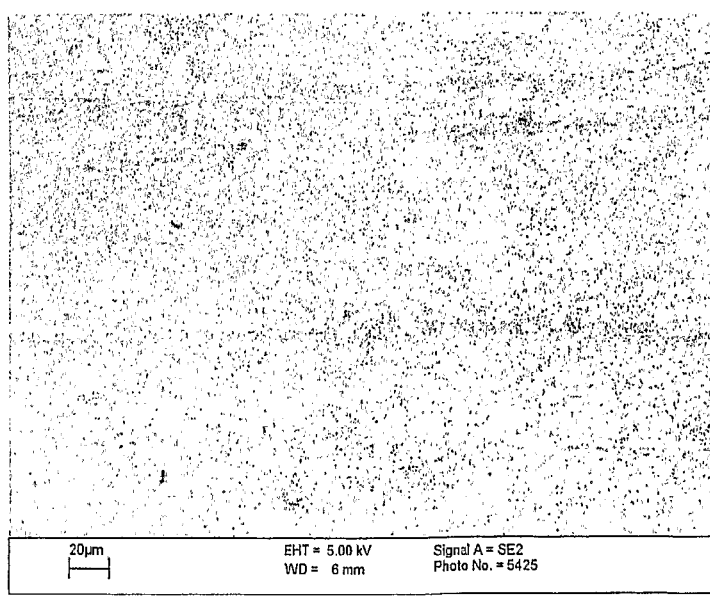
FIG. 2 is a similar view to FIG. 1 but of a die pressed compact according to the invention.
Figure 3:
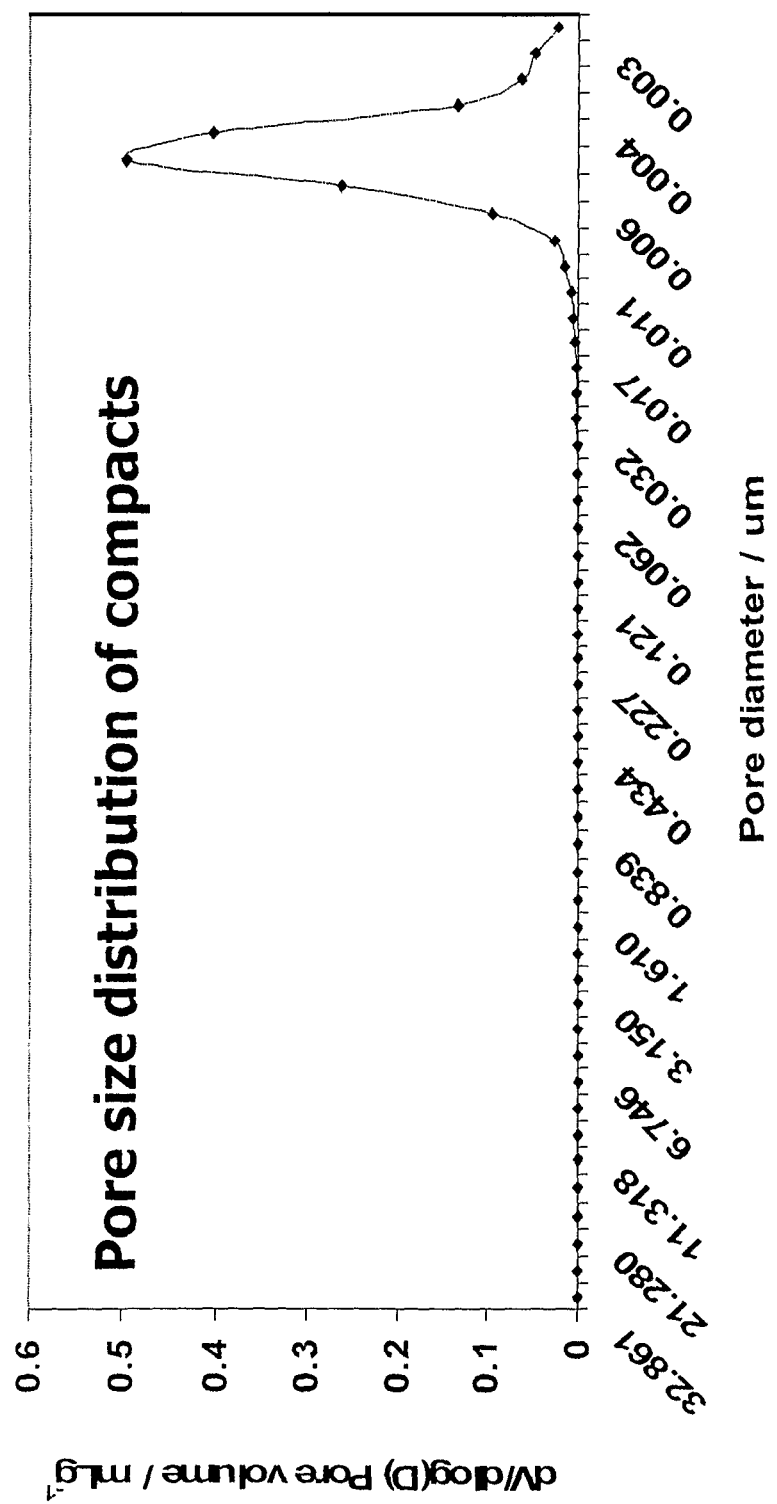
FIG. 3 is a Mercury Porosimetry plot of pore volume against pore size of a die pressed compact similar to FIG. 2 produced as per the invention.

The granules made by the above method are weaker than would be the case without the freon additive, and the fracture surface as shown in FIG. 2 of a pressed green compact made by the method shows a uniform microstructure which can thus be sintered into a dense nanograined ceramic. This contrasts with FIG. 1 where no additive has been used, and uncrushed hard agglomerates can be seen. Mercury porosimetry data on compacts made from granules according to the present invention also confirms the achievement of a microstructure devoid of large pores (FIG. 3). This illustrates that the granules were crushed by the pressing.

The invention therefore provides a method of forming soft deformable nano granules which have excellent flowability, and also have high crushability. This means the granules can be broken down to their primary particles during pressing to provide the advantages as provided by nanoparticles outlined above.

It is to be realised that a wide range of modifications relative to the above described example can be made without departing from the scope of the invention. For example, different additives may be used, and potential examples include octylphenoxypolyethoyethanol such as Triton X available from National Diagnostics Inc of Atlanta USA, ammonium C6-10 alcohol ethoxysulfate such as Alpha foamer available from Stepan Canada Inc of Ontario Canada, or camphene. The additive will generally be a foaming agent or pore former, and it is advantageous if the additive has a boiling point of below 100° C. or is a sublimable solid which sublimes at a temperature of below 100° C. The additive can be added directly to the suspension or may be added as part of a solution.

The granules could be formed by spray drying, fluidising or using a shear granulator. The additive may be removed using heat and/or subjecting to reduced pressure. The heating may include microwave heating. The additive can be removed slowly and in a controlled manner to produce voids where the additive had been located, the voids providing flaws in the granules. Alternatively, the additive can be removed rapidly so as to produce cracks or other formations to provide flaws.

Additional additives may be added to the suspension to act as binders, plasticisers or lubricants. Different nanopowders could be used, which could be a different zirconia or other ceramics, or other materials, including for instance pharmaceuticals. The suspension may be aqueous or non-aqueous.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of forming granules, the method comprising forming a suspension of a nanopowder, adding to the suspension an additive, drying the suspension so as to form granules, and removing at least a substantial part of the additive from the granules to form flaws in the granules.

2. A method according to claim 1, wherein a concentrated suspension of nanoparticles is produced.

3. A method according to claim 1, wherein the additive is a foaming agent or a pore former.

4. A method according to claim 1, wherein the additive has a boiling point or sublimation temperature of below 100° C.

5. A method according to claim 1, wherein the additive is a fluid or solid.

6. A method according to claim 1, wherein the additive is any of Freon, octylphenoxypolyethoyethanol, ammonium C6-10 alcohol ethoxysulfate, or camphene.

7. A method according to claim 1, wherein the additive is added to the suspension directly.

8. A method according to claim 1, wherein the additive is added to the suspension in solution.

9. A method according to claim 1, wherein the suspension is dried so as to form generally spherical granules.

10. A method according to claim 9, wherein the suspension is dried using a spraying device.

11. A method according to claim 10, wherein the suspension is dried using spray freeze drying.

12. A method according to claim 10, wherein the suspension is dried using spray drying.

13. A method according to claim 1, wherein the granules are formed by fluidizing or using a shear granulator.

14. A method according to claim 1, wherein removing of the additive includes heating of the granules and/or subjecting the granules to reduced pressure.

15. A method according to claim 14, wherein the heating includes microwave heating.

16. A method according to claims claim 1, wherein at least some of the additive is removed in a controlled manner such that flaws are provided in the granules by removal of the additive.

17. A method according to claim 1, wherein at least some of the additive is removed rapidly so as to produce cracks or other formations in the granules to provide flaws.

18. A method according to claim 1, wherein additional additives are added to the suspension, which additives may act as binders, plasticisers, or lubricants.

19. A method according to claim 1, wherein the nanopowder is a ceramic powder.

20. A method according to claim 19, wherein the nanopowder is a zirconia powder.

21. A method according to claim 20, wherein the nanopowder is yttria stabilised zirconia including up to 10 mol % yttria.

22. A method according to claim 1, wherein the nanopowder has a particle size of substantially 20 nm.

23. A method according to claim 1, wherein the suspension is aqueous.

24. A method according to claim 1, wherein the suspension is non-aqueous.

25. A method of manufacturing a component, the method including forming granules by a method according to claim 1, locating the granules in a die press, and pressing the granules such that the granules break down during pressing to form a green compact.

26. A method according to claim 25, wherein the green compact is subsequently fired.

* * * * *

UNITED STATES PATENT AND TRADEMARK OFFICE
CERTIFICATE OF CORRECTION

PATENT NO. : 8,425,809 B2
APPLICATION NO. : 12/998385
DATED : April 23, 2013
INVENTOR(S) : Annapoorani Ketharam et al.

Page 1 of 1

It is certified that error appears in the above-identified patent and that said Letters Patent is hereby corrected as shown below:

In the Claims

Column 4, Line 22, Claim 16

Replace "16. A method according to claims claim 1, wherein"
With -- 16. A method according to claim 1, wherein --

Signed and Sealed this
Sixth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO.       : 8,425,809 B2
APPLICATION NO. : 12/998385
DATED            : April 23, 2013
INVENTOR(S)      : Ketharam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 188 days.

Signed and Sealed this
Eighth Day of September, 2015

Michelle K. Lee
*Director of the United States Patent and Trademark Office*